US008749971B2

(12) United States Patent
Liang et al.

(10) Patent No.: US 8,749,971 B2
(45) Date of Patent: Jun. 10, 2014

(54) ELECTRONIC DEVICE AND FIXING STRUCTURE THEREFOR

(75) Inventors: Chen-Yi Liang, New Taipei (TW); Cheng-Hsiang Chuang, New Taipei (TW); Chun-Chien Chen, New Taipei (TW); Shun-De Bai, New Taipei (TW); San-Pao Kao, New Taipei (TW)

(73) Assignee: Wistron Corporation (TW)

( * ) Notice: Subject to any disclaimer, the term of this patent is extended or adjusted under 35 U.S.C. 154(b) by 183 days.

(21) Appl. No.: 13/461,113

(22) Filed: May 1, 2012

(65) Prior Publication Data

US 2012/0287595 A1 Nov. 15, 2012

(30) Foreign Application Priority Data

May 9, 2011 (TW) .............................. 100208235 U (51) Int. Cl.
| H05K 7/00 | (2006.01) |
| H05K 5/00 | (2006.01) |
| E05C 17/56 | (2006.01) |
| E05C 19/16 | (2006.01) |

(52) U.S. Cl.
USPC ................. 361/679.57; 361/679.58; 361/747; 292/251.5

(58) Field of Classification Search
CPC ... H01L 43/08; G11B 5/3903; H01F 10/3254; G06F 1/1616; G06F 1/1677
USPC ............ 361/679.57–679.58, 747; 292/251.5, 292/303, 304, DIG. 53, DIG. 11; 220/676, 220/203.17, 223, 230, 483; 215/310, 378, 215/385

See application file for complete search history.

(56) References Cited

U.S. PATENT DOCUMENTS

| 6,151,486 A * | 11/2000 | Holshouser et al. ........ 455/575.3 |
| 6,366,440 B1 * | 4/2002 | Kung ............................. 361/147 |
| 6,891,722 B2 * | 5/2005 | Chen et al. ............... 361/679.55 |
| 7,354,080 B2 * | 4/2008 | Lee ................................. 292/162 |
| 8,223,489 B2 * | 7/2012 | Shih ........................ 361/679.58 |
| 2005/0018393 A1 * | 1/2005 | Kuo et al. ..................... 361/683 |
| 2006/0006674 A1 * | 1/2006 | Kang et al. ................. 292/251.5 |
| 2010/0270817 A1 * | 10/2010 | Yu ............................... 292/251.5 |

* cited by examiner

*Primary Examiner* — Adrian S Wilson
*Assistant Examiner* — Abhishek Rathod
(74) *Attorney, Agent, or Firm* — Merek, Blackmon & Voorhees, LLC (57) ABSTRACT

An electronic device includes a first body, a magnetic switch disposed in the first body, and a second body connected pivotally to and covering openably the first body. The second body includes a housing, and an electronic component module disposed in the housing and coupled electrically to the magnetic switch. A fixing structure is disposed in the housing and includes a casing and a blocker. The casing defines a receiving space and an opening that communicates with the receiving space. A magnetic element is disposed in the receiving space through the opening. The blocker is rotatable to block the opening and prevent the magnetic element from moving out of the receiving space through the opening.

22 Claims, 8 Drawing Sheets

ELECTRONIC DEVICE AND FIXING STRUCTURE THEREFOR

CROSS REFERENCE TO RELATED APPLICATION

This application claims priority of Taiwanese Patent Application No. 100208235, filed on May 9, 2011, the disclosure of which is incorporated herein by reference.

BACKGROUND OF THE INVENTION

1. Field of the Invention

This invention relates to a fixing structure of an electronic device, and more particularly to a fixing structure for fixing a magnetic element on a base wall and an electronic device having the same.

2. Description of the Related Art

Figure 9:
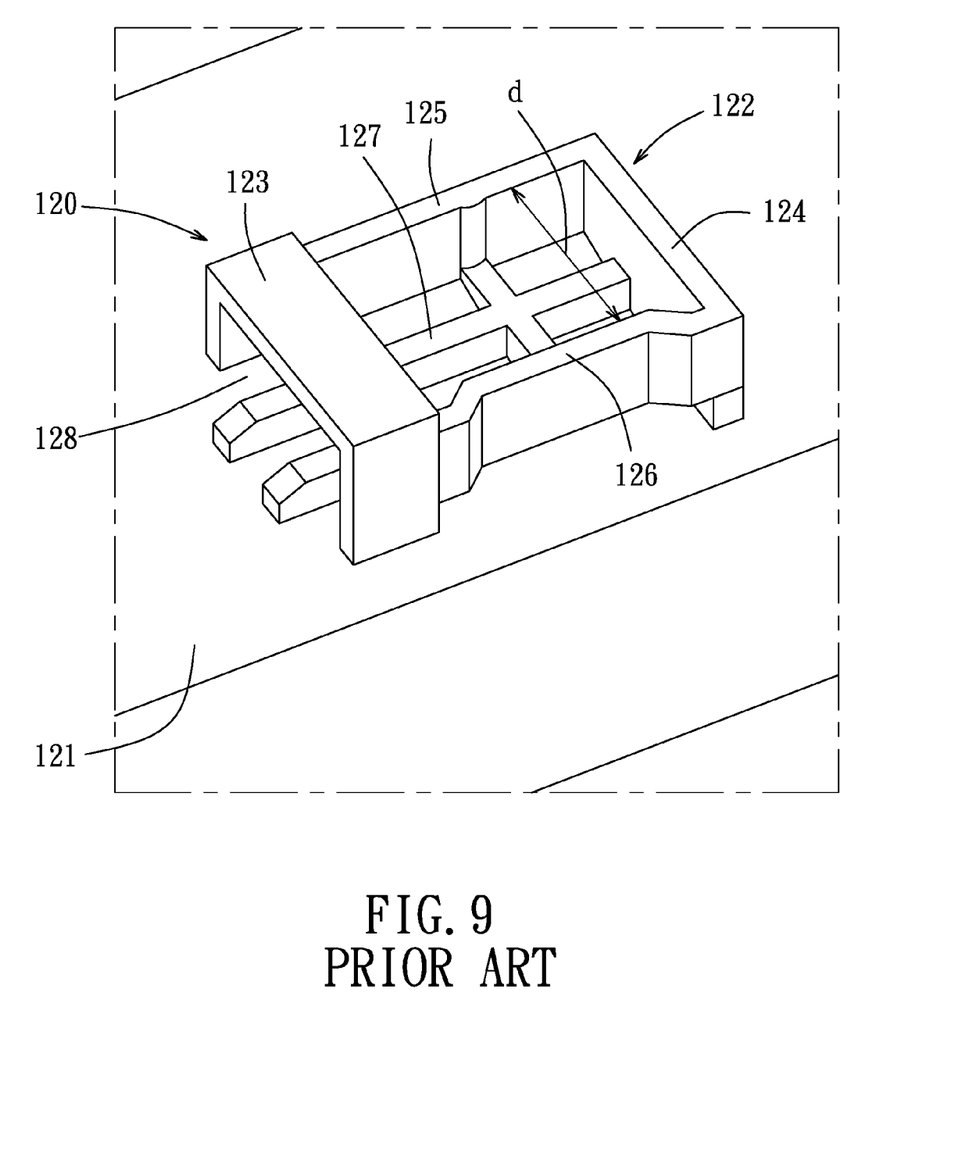
FIG. 9 is a perspective view of a conventional magnetic fixing structure as disclosed in Taiwanese Patent No. M348452.

Referring to FIG. 9, Taiwanese Patent No. M348452 discloses a conventional magnetic fixing structure 120 for a notebook computer. The magnetic fixing structure 120 includes a bottom plate 121, a U-shaped frame 122, and a top wall 123. The U-shaped frame 122 is disposed perpendicularly on and connected to the bottom plate 121 and includes first, second, and third side walls 124, 125, 126. The first side wall 124 is disposed between the second and third side walls 125, 126. The top wall 123 cooperates with the U-shaped frame 122 to define a receiving space 127 and an opening 128. The opening 128 is opposite to the first side wall 124 of the U-shaped frame 122 and is in spatial communication with the receiving space 127. The receiving space 127 is used for receiving a magnetic element that is inserted into the receiving space 127 through the opening 128.

A distance (d) between the second side wall 125 and a portion of the third side wall 126 is smaller than a width dimension of the first side wall 124 as well as a dimension of the magnetic element in a direction that the second and third side walls 125, 126 are spaced apart. When the magnetic element is inserted into the receiving space 127 through the opening 128, the third side wall 126 is biased by the magnetic element so as to resiliently deform and to cooperate with the second side wall 125 to clamp the magnetic element therebetween. However, the magnetic element is apt to be removed from the receiving space 127 of the conventional magnetic fixing structure 120 when the notebook computer encounters an impact or an external force.

SUMMARY OF THE INVENTION

Therefore, an object of the present invention is to provide a fixing structure that is capable of overcoming the aforementioned drawback of the prior art and an electronic device having the same.

According to one aspect of this invention, an electronic device comprises a first body, a magnetic switch disposed in the first body, a second body connected pivotally to and covering openably the first body, a magnetic element, and a fixing structure. The second body includes a housing and an electronic component module disposed in the housing and coupled electrically to the magnetic switch. The fixing structure is disposed in the housing and includes a casing and a blocker. The casing defines a receiving space and an opening that communicates with the receiving space. The magnetic element is disposed in the receiving space through the opening. The blocker is rotatable to block the opening and prevent the magnetic element from moving out of the receiving space through the opening.

According to another aspect of this invention, a fixing structure of an electronic device for fixing a magnetic element to a second body of the electronic device and for cooperating with a magnetic switch of a first body of the electronic device comprises a casing and a blocker. The casing is adapted to be disposed in the second body, and defines a receiving space and an opening that communicates with the receiving space. The receiving space is adapted to receive the magnetic element through the opening. The blocker is adapted to be disposed in the second body and is rotatable to block the opening for preventing the magnetic element from moving out of the receiving space through the opening.

BRIEF DESCRIPTION OF THE DRAWINGS

Other features and advantages of the present invention will become apparent in the following detailed description of the embodiments with reference to the accompanying drawings, of which.

DETAILED DESCRIPTION OF THE PREFERRED EMBODIMENTS

The above-mentioned and other technical contents, features, and effects of this invention will be clearly presented from the following detailed description of two embodiments in coordination with the reference drawings.

Before this invention is described in detail, it should be noted that, in the following description, similar elements are designated by the same reference numerals.

Referring to FIGS. 1 to 4, an electronic device 100 according to the first embodiment of the present invention is shown to comprise a first body 1, a second body 2, a magnetic switch 3 disposed in the first body 1, a magnetic element 4 which is a magnet in this embodiment, and a fixing structure 5 disposed in the second body 2. The second body 2 is connected pivotally to a lateral side of the first body 10 so as to cover or uncover the first body 1. When the second body 2 covers the first body 1, the magnetic switch 3 is aligned with and is magnetically induced by the magnetic element 4 to output a control signal that controls electronic components of the first or second body 1, 2. In this embodiment, the electronic device 100 is a notebook computer, the first body 1 is a computer host, and the second body 2 is a display screen. The control signal is used to control the power supplied by the computer host to the display screen. In other alternative embodiments, the electronic device 100 may be other flip-type electronic devices.

Figure 1:
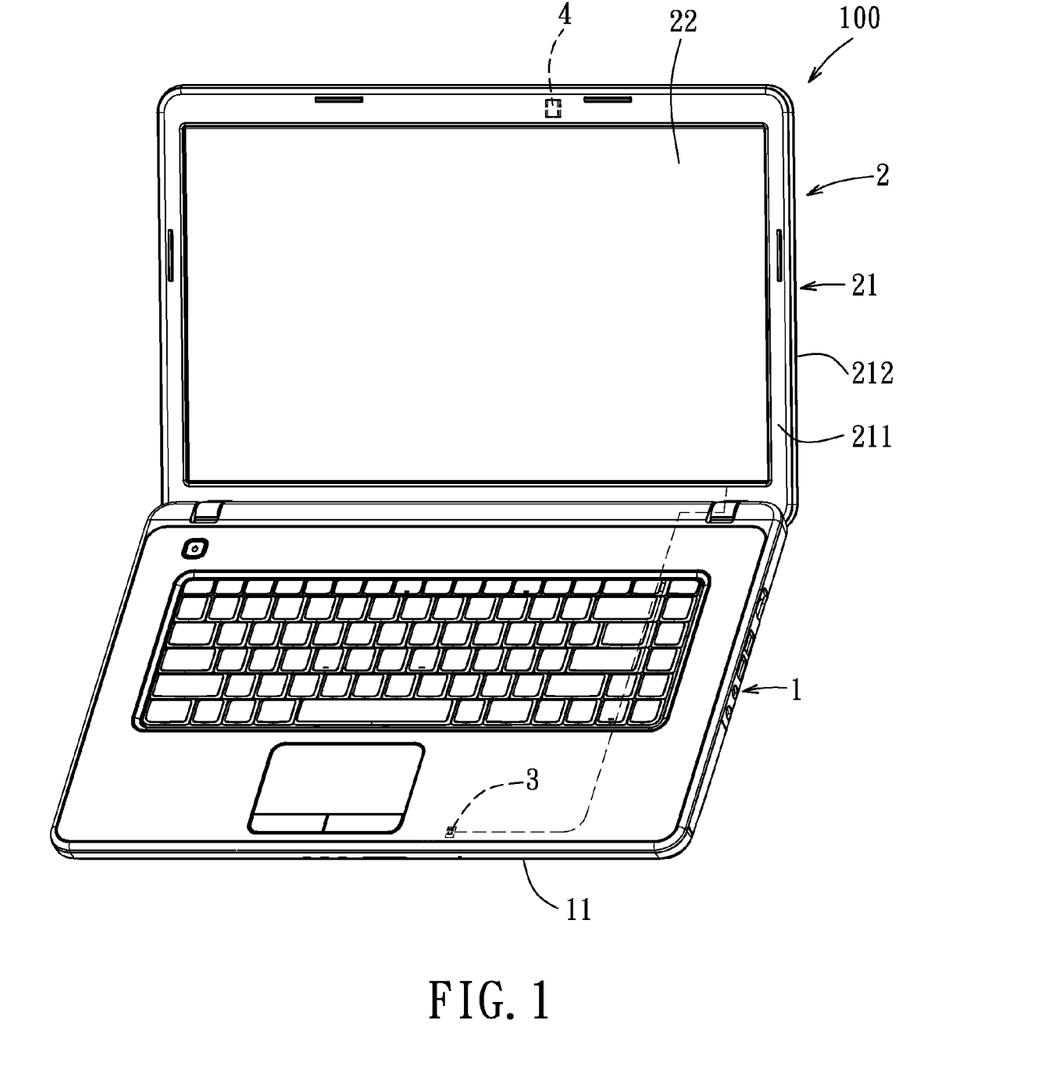
FIG. 1 is a perspective view of an electronic device according to the first embodiment of this invention.

The first body 1 has a front edge 11. The magnetic switch 3 is disposed in the first body 1 in proximity to the front edge 11. The second body 2 includes a housing 21 and an electronic component module 22 disposed in the housing 21. The housing 21 includes a box-like front housing part 211 and a rear housing part 212 connected to the front housing part 211. The electronic component module 22 is disposed between the front and rear housing parts 211, 212. The front housing part 211 has a base wall 213 facing the rear housing part 212. In this embodiment, the electronic component module 22 refers to a display module, and is coupled electrically to the magnetic switch 3.

Figure 2:
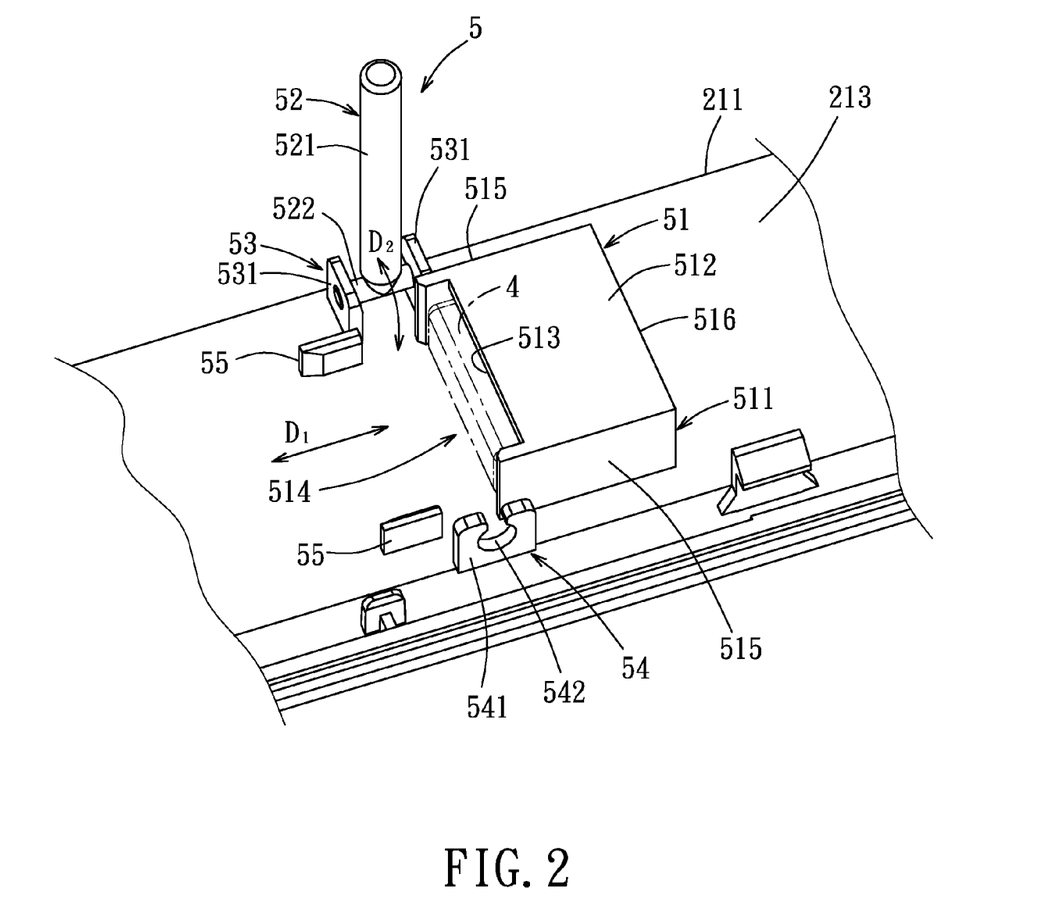
FIG. 2 is an enlarged perspective view of a fixing structure of the first embodiment.

With reference to FIGS. 1 and 2, the fixing structure 5 is disposed in the housing 21 of the second body 2. In this embodiment, the fixing structure 5 includes a casing 51 and a blocker 52. The casing 51 is connected to the base wall 213 of the front housing part 211 in proximity to a top edge thereof. The casing 51 includes a generally U-shaped peripheral wall 511 projecting rearwardly from the base wall 213, and a cover wall 512 connected to the peripheral wall 511 and spaced apart from the base wall 213. The peripheral wall 511 and the cover wall 512 cooperatively define a receiving space 513 that receives the magnetic element 4 and an opening 514 that communicates with the receiving space 513. Concretely speaking, the peripheral wall 511 includes two spaced-apart sidewalls 515, and a connecting wall 516 interconnecting the sidewalls 515. The cover wall 512 is connected to the sidewalls 515 and the connecting wall 516. In this embodiment, the opening 514 lies on a plane that is perpendicular to the base wall 513, so that the magnetic element 4 can slide into the receiving space 513 in a direction (D1) that is parallel to the base wall 213. Specifically, in this embodiment, through the structure of the casing 51, the sliding movement of the magnetic element 4 into or out of the casing 51 is restricted to only one direction.

The blocker 52 is rotatable to block the opening 514 so as to prevent the magnetic element 4 from sliding out of the receiving space 513 through the opening 514 when the magnetic element 4 is disposed in the receiving space 513.

The blocker 52 is connected pivotally to the base wall 213 and is rotatable relative to the casing 51. In this embodiment, the fixing structure 5 further includes a pivot connection seat 53 disposed in proximity to one of the sidewalls 515, and a limiting member 54 disposed in proximity to the other sidewall 515. The pivot connection seat 53 includes two spaced-apart parallel pivot connection plates 531 connected to the base wall 213. The limiting member 54 has a plate body 541 connected to the base wall 213 and formed with a generally C-shaped engaging groove 542. The open side of the C-shaped engaging groove 542 is opposite to the base wall 213.

Figure 4:
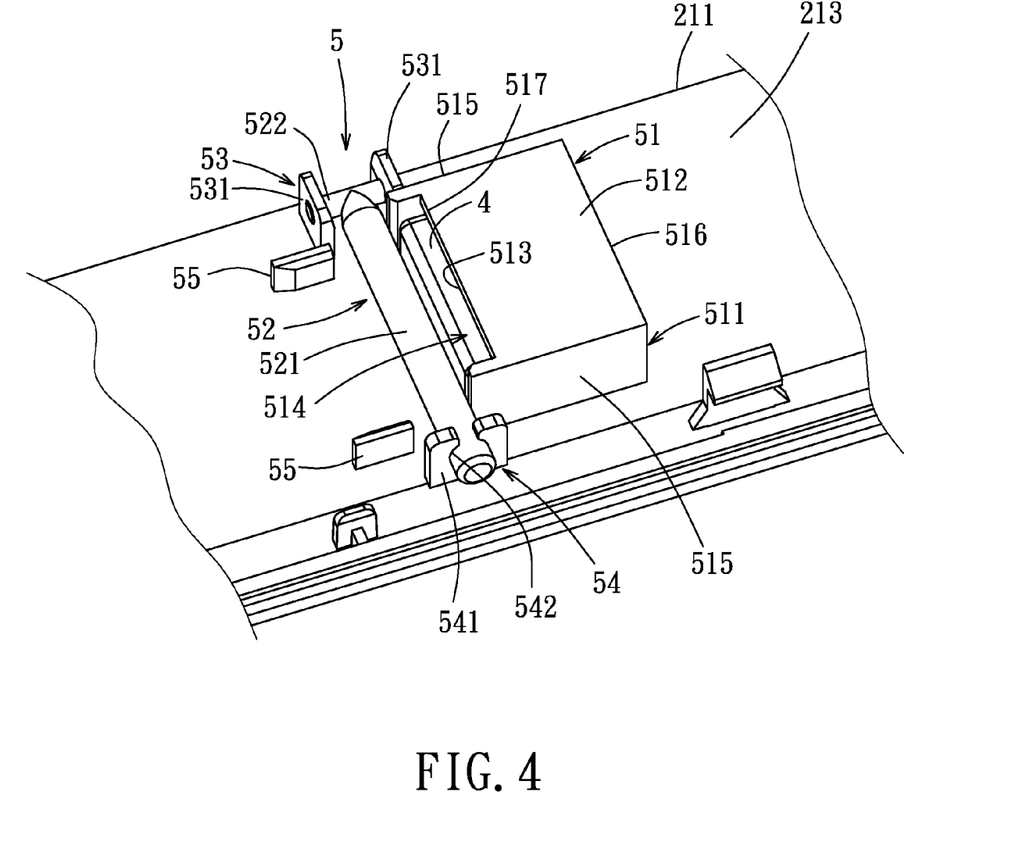
FIG. 4 is a view similar to FIG. 3, but illustrating how a blocker blocks an opening of the casing.

The blocker 52 includes a first rod section 521 and a second rod section 522 connected to each other to form a generally T-shaped structure. The second rod section 522 has two opposite ends connected rotatably and respectively to the pivot connection plates 531 so that the blocker 52 is rotatable relative to the casing 51. The blocker 52 has a plane of rotation perpendicular to the base wall 213, and is rotatable toward or away from the base wall 213 in a direction (D2). When the blocker 52 is rotated until the first rod section 521 engages the engaging groove 512 of the limiting member 54, as shown in FIG. 4, the first rod section 521 is limited at a position that is generally parallel to the base wall 213 and that extends across the opening 514 to thereby block the opening 514. Alternatively, the first rod section 521 may be configured to be a plate.

Hence, it is apparent from the aforesaid description that, in addition to the provision of the casing 51 that accommodates the magnetic element 4, the present invention is also provided with the rotatable blocker 52 to block the opening 514, thereby preventing the magnetic element 4 from moving out of the receiving space 513 via the opening 514.

In this embodiment, the fixing structure 5 further includes a pair of spaced-apart guide plates 55 connected to the base wall 213 in proximity to the opening 514 and aligned with the respective sidewalls 515.

Figure 3:
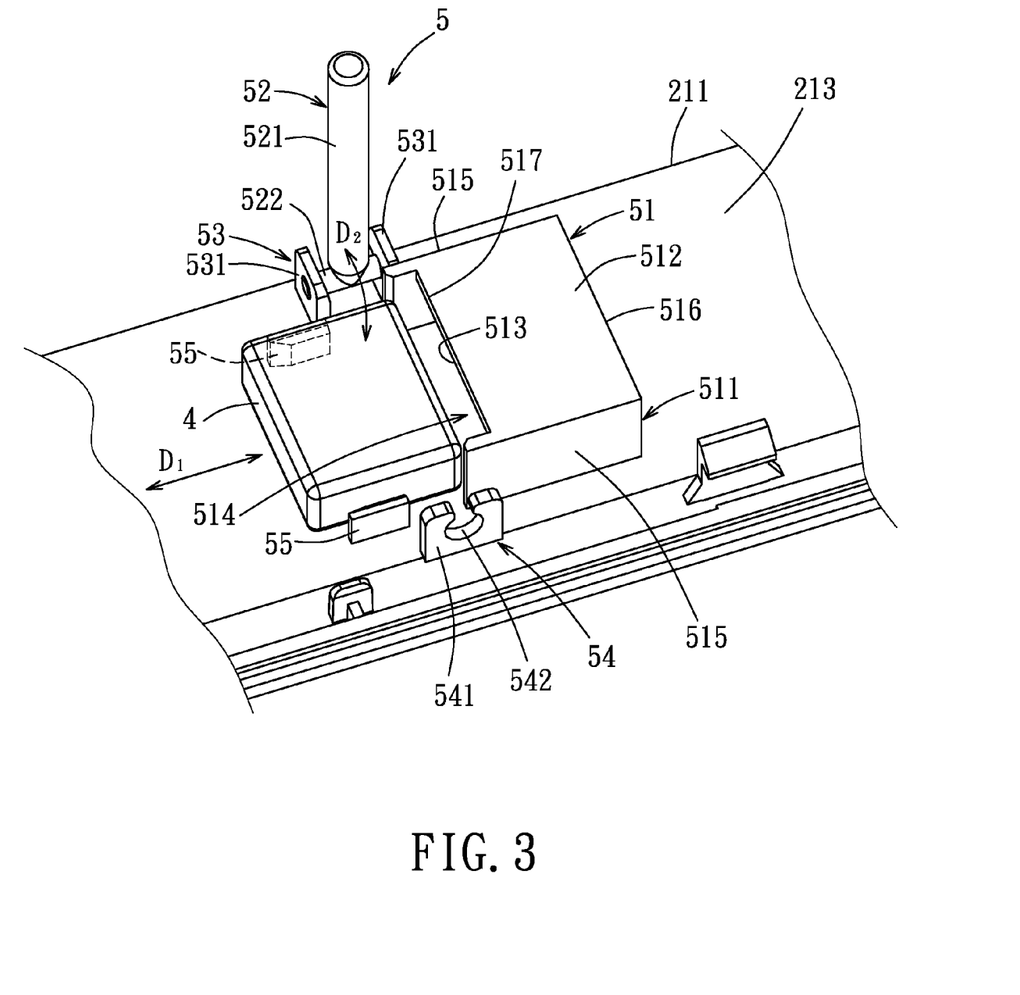
FIG. 3 is a view similar to FIG. 2, but illustrating how a magnetic element is moved into a casing of the fixing structure.

Referring to FIG. 3, to assemble the magnetic element 4 to the front housing part 211, the magnetic element 4 is first placed on the base wall 213 between the guide plates 55, and is then guided by the guide plates 55 to slide along the direction (D2) into the receiving space 513 via the opening 514. Next, the blocker 52 is rotated toward the base wall 213 along the direction (D2) until the first rod section 521 engages the engaging groove 542 of the limiting member 54 and blocks the opening 514, as shown in FIG. 4. Hence, the magnetic element 4 is prevented from sliding out of the receiving space 513 via the opening 514.

Moreover, in this embodiment, the cover wall 512 of the casing 51 has a cutout 517 disposed in proximity to the opening 514 to expose partially the magnetic element 4 when the latter is disposed in the receiving space 513. Hence, through the provision of the cutout 517, the presence of the magnetic element 4 in the casing 51 can be determined.

Referring to FIGS. 5 to 8, an electronic device according to the second embodiment of this invention is shown to be similar to the first embodiment. The difference between the first and second embodiments resides in the construction of the fixing structure 6.

Figure 5:
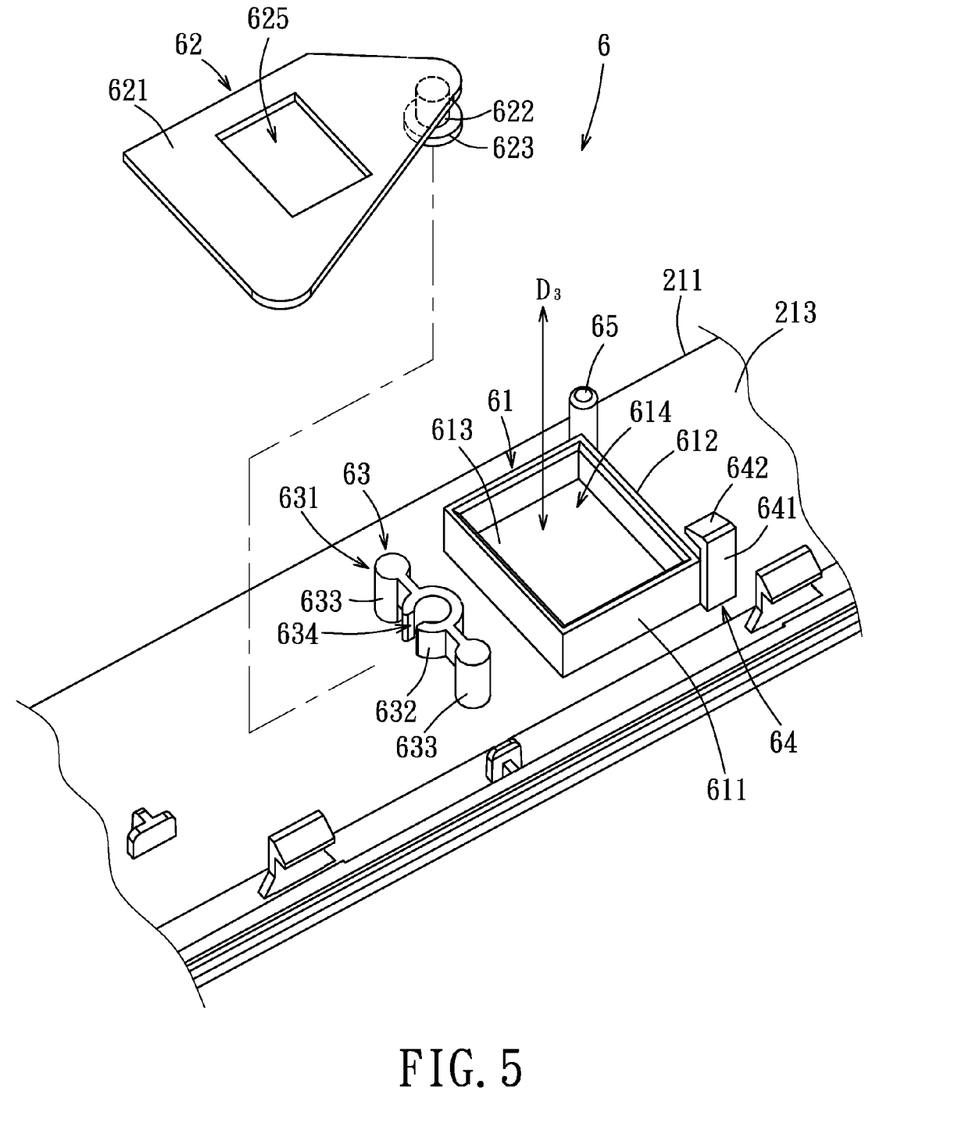
FIG. 5 is an enlarged partially exploded perspective view of a fixing structure of an electronic device according to the second embodiment of this invention.

In this embodiment, the fixing structure 6 includes a casing 61, a blocker 62, a pivot connection seat 63 and a limiting member 64. The casing 61 includes a peripheral wall 611 connected of the base wall 213 and having a rectangular shape. The peripheral wall 611 defines a receiving space 613, and has a peripheral edge 612 distal from the base wall 213 and defining an opening 614. The opening 614 lies in a plane that is parallel to the base wall 213. The peripheral wall 611 is not limited to the rectangular shape, any shape is acceptable as long as the magnetic element 4 can be accommodated therein.

Figure 6:
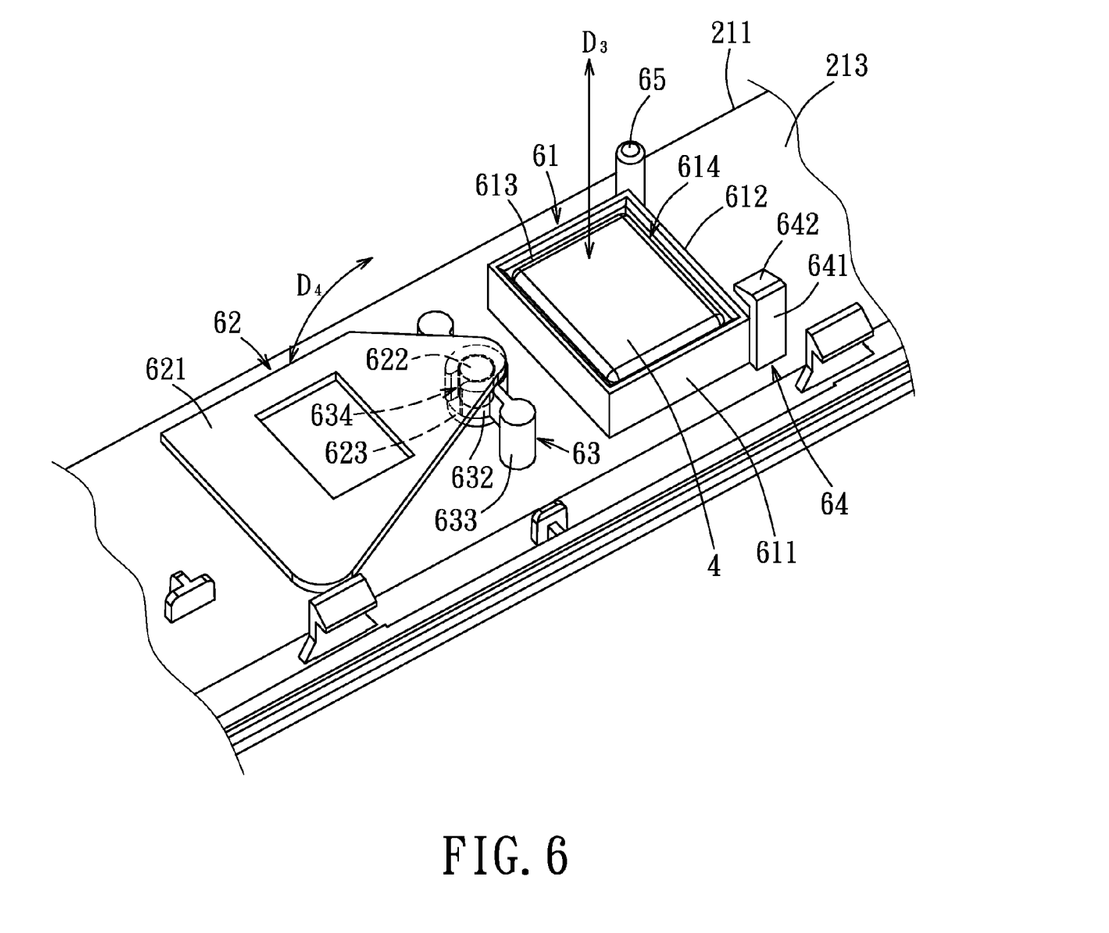
FIG. 6 is a perspective view of the fixing structure of the second embodiment in an assembled state, illustrating how a magnetic element is placed in a casing of the fixing structure.

With reference to FIGS. 5 and 6, the blocker 62 includes a blocking plate 621, a pivot pin 622 extending from the blocking plate 621 toward the base wall 213, and a flange 623 connected to the pivot pin 622 and spaced apart from the blocking plate 621.

Figure 8:
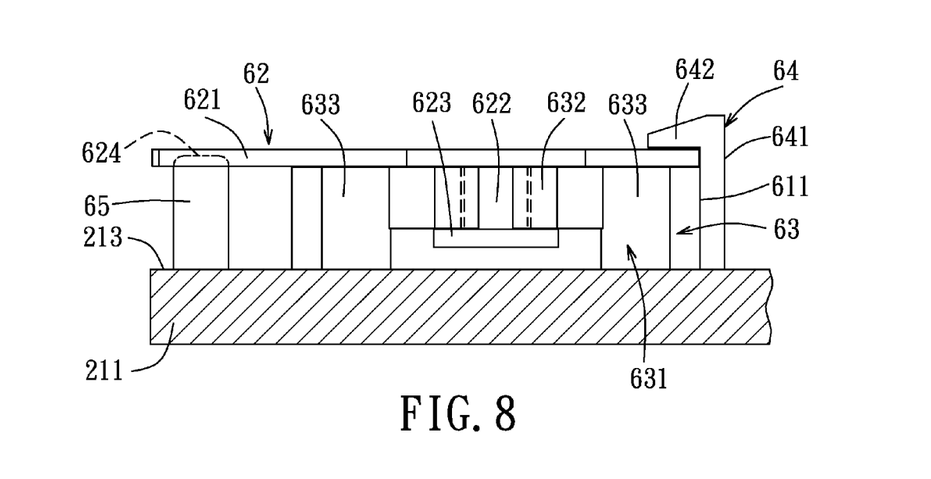
FIG. 8 is a schematic side view of FIG. 7.

In conjunction with FIG. 8, the pivot connection seat 63 includes a fixed part 631, and a tubular sleeve 632 connected to the fixed part 631 and spaced apart from the base wall 213. The fixed part 631 includes two spaced-apart studs 633 connected to the base wall 213 in proximity to the casing 61. The tubular sleeve 632 is connected between the two studs 633 so as to be suspended therefrom and spaced apart from the base wall 213. In this embodiment, the tubular sleeve 632 has a generally C-shaped cross section with a slot 634 opposite the casing 61.

The blocker 62 is pivoted to the pivot connection seat 63 by inserting the pivot pin 622 into the tubular sleeve 632 via the slot 634 so that the tubular sleeve 632 is disposed between the blocking plate 621 and the flange 623. The blocking plate 621 is substantially parallel to the base wall 213. The blocker 62 has a plane of rotation parallel to the base wall 213. That is, the blocker 62 is rotatable relative to the base wall 213 along a direction (D4), as shown in FIG. 6.

In this embodiment, the limiting member 64 is disposed adjacent to the casing 61 and has a generally inverted L-shaped cross section. The limiting member 64 includes a first limiting plate 641 connected to and extending rearwardly from the base wall 213 in proximity to the peripheral wall 611, and a second limiting plate 642 connected to the first limiting plate 641 and spaced apart from the base wall 213.

Figure 7:
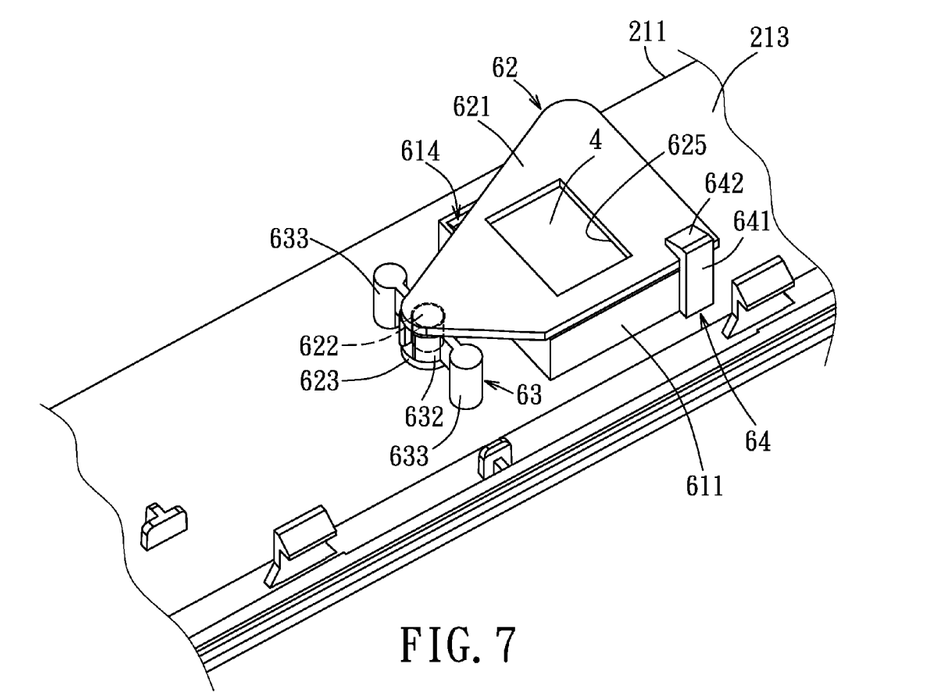
FIG. 7 is a view similar to FIG. 6, but illustrating how a blocker blocks an opening of the casing.

With reference to FIGS. 6 to 8, to assemble the magnetic element 4 to the front housing part 211, as shown in FIG. 6, the magnetic element 4 is placed into the receiving space 613 of the casing 61 via the opening 614 along a direction (D3) which is perpendicular to the base wall 213. Then, as shown in FIG. 7, the blocker 62 is rotated until the blocking plate 621 covers the opening 614 of the casing 61, thereby blocking movement of the magnetic element 4 out of the receiving space 613 via the opening 614.

The limiting member 64 is disposed at a position that faces the blocker 62 when the blocker 62 rotates toward the casing 61 and that is downstream of the direction (D4). That is, the limiting member 64 is disposed along a rotation route of the blocker 62. When the blocker 62 rotates toward the casing 61, it stops as the blocking plate 621 abuts against the first limiting plate 641. At this time, the blocking plate 621 covers the opening 614, and is disposed between the second limiting plate 642 and the peripheral wall 611. Hence, the limiting member 64 also serves to prevent over-rotation of the blocker 62, and the second limiting plate 642 thereof serves to prevent the blocking plate 621 from moving in a direction away from the opening 614.

To enhance the positioning effect of the blocker 62, the fixing structure 6 further includes a positioning member 65 disposed in proximity to the casing 61. In this embodiment, the positioning member 65 is configured as a post, and the blocking plate 621 is formed with a positioning notch 624 at a surface thereof that faces the base wall 213. When the blocker 62 rotates until the blocking plate 621 abuts against the limiting member 64, a top end of the positioning member 65 engages the positioning notch 624, thereby assisting the blocking plate 621 to be positioned in a state that covers the opening 614. The positioning notch 624 may also be a hole that extends through the blocking plate 621. The aforesaid coordination between the positioning member 65 and the positioning notch 624 may also be regarded as another modification of the limiting member in this embodiment.

Therefore, through the coordination of the limiting member 64 and the engagement of the positioning member 65 with the positioning notch 624, the blocker 62 can be restricted at a position that covers the opening 614.

Moreover, the blocking plate 621 may be further formed with a window 625. The size of the window 625 is smaller than that of the opening 614 and the magnetic element such that the magnetic element 4 cannot pass therethrough. When the blocking plate 621 is rotated to cover the opening 614, the magnetic element 4 is partially exposed from the window 625. Through the presence of the window 625, it can be determined whether or not the magnetic element 4 is disposed in the receiving space 613.

It is worth mentioning that the fixed part 631 of the pivot connection seat 63 in this embodiment is used to support the tubular sleeve 632 so that the tubular sleeve 632 is spaced apart from the base wall 213. When the blocker 62 is pivoted to the pivot connection seat 63, the flange 623 will not be in frictional contact with the base wall 213. However, the structure of the fixed part 631 is not limited to the two studs 633 of this embodiment. For example, the fixed part 631 may include only one stud 633 or other alternative structures. As long as the tubular sleeve 632 is supported so as to be spaced apart from the base wall 213 and the flange 623 will not be in frictional contact with the base wall 213, any structure of the fixed part 631 is acceptable.

Additionally, in the aforesaid two embodiments, the blocker 52, 62 is restricted to cover the opening 514, 614 by the limiting member 54, 64. However, in other alternative embodiments, the structural cooperation between the blocker 52, 62 and the pivot connection seat 53, 63 may also be used to restrict the blocker 52, 62 from being arbitrarily rotated, so that the effect of covering the opening 514, 614 by the blocker 52, 62 may be achieved.

In summary, in addition to the structural design of the casing 51, 61 which can receive the magnetic element 4, the present invention is also provided with the blocker 52, 62 which is operably rotatable to block the opening 514, 614 and prevent the magnetic element 4 from moving out of the casing 51, 61. Therefore, the object of this invention can be realized.

While the present invention has been described in connection with what are considered the most practical embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An electronic device comprising:
   a first body;
   a magnetic switch disposed in said first body;
   a second body connected pivotally to and covering openably said first body, said second body including a housing and an electronic component module disposed in said housing and coupled electrically to said magnetic switch;
   a magnetic element; and
   a fixing structure disposed in said housing and including
      a casing defining a receiving space and an opening that communicates with said receiving space, said magnetic element being disposed in said receiving space through said opening, and
      a blocker rotatable to block said opening and prevent said magnetic element from moving out of said receiving space through said opening.

2. The electronic device as claimed in claim 1, wherein said fixing structure further includes a limiting member disposed in proximity to said casing, said limiting member limiting said blocker at a position that blocks said opening of said casing.

3. The electronic device as claimed in claim 2, wherein said housing includes a base wall, said casing including a generally U-shaped peripheral wall connected to said base wall, and a cover wall connected to said peripheral wall and spaced apart from said base wall, said peripheral wall and said cover wall cooperatively defining said receiving space and said opening, said opening lying in a plane that is perpendicular to said base wall, said blocker having a plane of rotation perpendicular to said base wall.

4. The electronic device as claimed in claim 3, wherein said peripheral wall includes two spaced-apart sidewalls, said fixing structure further including a pivot connection seat disposed in proximity to one of said sidewalls, said blocker being pivoted to said pivot connection seat, said limiting member being proximate to the other one of said sidewalls.

5. The electronic device as claimed in claim 4, wherein said pivot connection seat includes two spaced-apart pivot connection plates, said blocker including a first rod section and a second rod section connected to each other to form a generally T-shaped structure, said second rod section having two opposite ends connected respectively to said pivot connection plates so as to connect pivotally said blacker to said pivot connection seat.

6. The electronic device as claimed in claim 5, wherein said limiting member has a plate body formed with an engaging groove to engage said first rod section.

7. The electronic device as claimed in claim 2, wherein said housing includes a base wall, said casing including a peripheral wall connected to said base wall, said peripheral wall having a peripheral edge distal from said base wall and defining said opening, said opening lying in a plane that is parallel to said base wall, said blocker having a plane of rotation parallel to said base wall.

8. The electronic device as claimed in claim 7, wherein said blacker is connected pivotally to said base wall, and includes a blocking plate to cover said opening.

9. The electronic device as claimed in claim 8, wherein said fixing structure further includes a pivot connection seat disposed in proximity to said casing, said pivot connection seat including a fixed part, and a tubular sleeve connected to said fixed part and spaced apart from said base wall, said tubular sleeve having a generally C-shaped cross section, said blocker further including a pivot pin extending from said blocking plate into said tubular sleeve, and a flange connected to said pivot pin and spaced apart from said blocking plate, said tubular sleeve being disposed between said blocking plate and said flange.

10. The electronic device as claimed in claim 8, wherein said blocking plate is formed with a positioning notch at a surface thereof that faces said base wall, said fixing structure further including a positioning member disposed in proximity to said casing and engaging said positioning notch when said blocker is rotated to block said opening.

11. The electronic device as claimed in claim 8, wherein said limiting member has a generally inverted L-shaped cross section and includes a first limiting plate connected to said base wall in proximity to said peripheral wall, and a second limiting plate connected to said first limiting plate and spaced apart from said base wall, said blocking plate abutting against said first limiting plate and being disposed between said peripheral wall and said second limiting plate when said blocker is rotated to block said opening.

12. A fixing structure of an electronic device for fixing a magnetic element to a second body of the electronic device and for cooperating with a magnetic switch of a first body of the electronic device, said fixing structure comprising:
  a casing disposed in the second body and defining a receiving space and an opening that communicates with said receiving space, said receiving space receiving the magnetic element through said opening; and
  a blocker disposed in the second body and rotatable to block said opening for preventing the magnetic element from moving out of said receiving space through said opening.

13. The fixing structure as claimed in claim 12, further comprising a limiting member adapted to be disposed in the second body in proximity to said casing, said limiting member limiting said blocker at a position that blocks said opening of said casing.

14. The fixing structure as claimed in claim 13, wherein said casing includes a generally U-shaped peripheral wall adapted to be connected to a base wall of the second body, and a cover wall connected to said peripheral wall and adapted to be spaced apart from the base wall, said peripheral wall and said cover wall cooperatively defining said receiving space and said opening, said opening lying in a plane that is perpendicular to the base wall, said blocker having a plane of rotation perpendicular to the base wall.

15. The fixing structure as claimed in claim 14, wherein said peripheral wall includes two spaced-apart sidewalls, said fixing structure further comprising a pivot connection seat disposed in proximity to one of said sidewalls, said blocker being pivoted to said pivot connection seat, said limiting member being proximate to the other one of said sidewalls.

16. The fixing structure as claimed in claim 15, wherein said pivot connection seat includes two spaced-apart pivot connection plates, said blocker including a first rod section and a second rod section connected to each other to form a generally T-shaped structure, said second rod section having two opposite ends connected respectively to said pivot connection plates so as to connect pivotally said blacker to said pivot connection seat.

17. The fixing structure as claimed in claim 16, wherein said limiting member has a plate body formed with an engaging groove to engage said first rod section.

18. The fixing structure as claimed in claim 13, wherein said casing includes a peripheral wall adapted to be connected to a base wall of the second body, said peripheral wall having a peripheral edge adapted to be distal from the base wall and defining said opening, said opening lying in a plane that is parallel to the base wall, said blocker having a plane of rotation parallel to the base wall.

19. The fixing structure as claimed in claim 18, wherein said blocker is adapted to be connected pivotally to the base wall, and includes a blocking plate to cover said opening.

20. The fixing structure as claimed in claim 19, further comprising a pivot connection seat, said pivot connection seat including a fixed part adapted to be connected to the base wall, and a tubular sleeve connected to said fixed part and adapted to be spaced apart from the base wall, said tubular sleeve having a generally C-shaped cross section, said blocker further including a pivot pin extending from said blocking plate into said tubular sleeve, and a flange connected to said pivot pin and spaced apart from said blocking plate, said tubular sleeve being disposed between said blocking plate and said flange.

21. The fixing structure as claimed in claim 19, wherein said blocking plate is formed with a positioning notch at a surface thereof that faces the base wall, said fixing structure further comprising a positioning member disposed in proximity to said casing and engaging said positioning notch when said blocker is rotated to block said opening.

22. The fixing structure as claimed in claim 19, wherein said limiting member has a generally inverted L-shaped cross section and includes a first limiting plate adapted to be connected to the base wall in proximity to said peripheral wall, and a second limiting plate connected to said first limiting plate and adapted to be spaced apart from the base wall, said blocking plate abutting against said first limiting plate and being disposed between said peripheral wall and said second limiting plate when said blocker is rotated to block said opening.

* * * * *